United States Patent [19]

Munro, III et al.

[11] Patent Number: 5,215,824
[45] Date of Patent: Jun. 1, 1993

[54] RF-TRANSPARENT SPACECRAFT THERMAL CONTROL BARRIER

[75] Inventors: John G. Munro, III; Paul V. Barcomb, both of Princeton; Roman Herschitz, Plainsboro, all of N.J.

[73] Assignee: General Electric Co., East Windsor, N.J.

[21] Appl. No.: 623,144

[22] Filed: Dec. 5, 1990

[51] Int. Cl.$^5$ .............................................. B32B 27/00
[52] U.S. Cl. ........................ 428/473.5; 428/172; 428/178; 428/174; 428/702; 428/207; 428/213; 428/458; 428/447; 393/872
[58] Field of Search ............... 428/212, 156, 172, 213, 428/207, 209, 474.4, 474.7, 213, 204, 473.5, 447, 167, 72, 76, 178, 174, 195, 458, 451, 702; 343/872

[56] References Cited

U.S. PATENT DOCUMENTS 3,295,131 12/1966 Hollingsworth ..................... 343/18
3,396,400 8/1968 Kelly et al. ........................ 343/872
4,479,131 10/1984 Rogers et al. ..................... 343/872

*Primary Examiner*—Donald J. Loney
*Attorney, Agent, or Firm*—William H. Meise; Stephen A. Young; Clement A. Berard

[57] ABSTRACT

An RF-transparent blanket provides thermal protection against solar and laser radiation. The blanket includes an outer layer of a transparent Kapton dielectric sheet with an outer surface coated with electrically conductive transparent indium-tin oxide to aid in suppressing electrostatic discharge. A second layer includes a transparent Kapton dielectric sheet with a coating of white silicone paint on the surface facing the first sheet. The outermost Kapton sheet protects the paint from long-term damage due to charged particle fluence and ultraviolet radiation. Further sheets of uncoated transparent Kapton, which may be embossed, are interposed between the second layer and a surface upon which an antenna is mounted to provide thermal insulation.

12 Claims, 2 Drawing Sheets

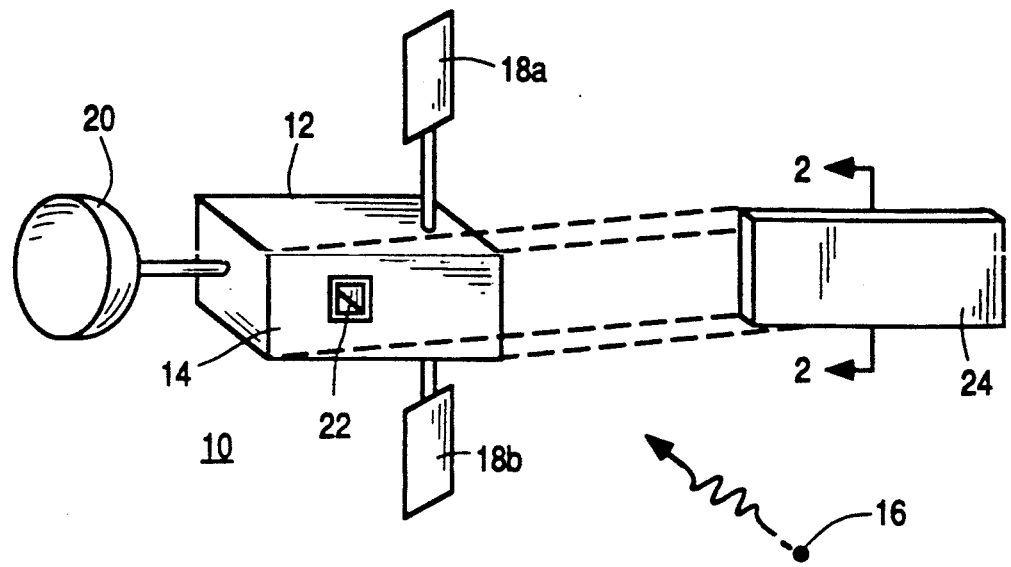
FIG. 1
FIG. 2
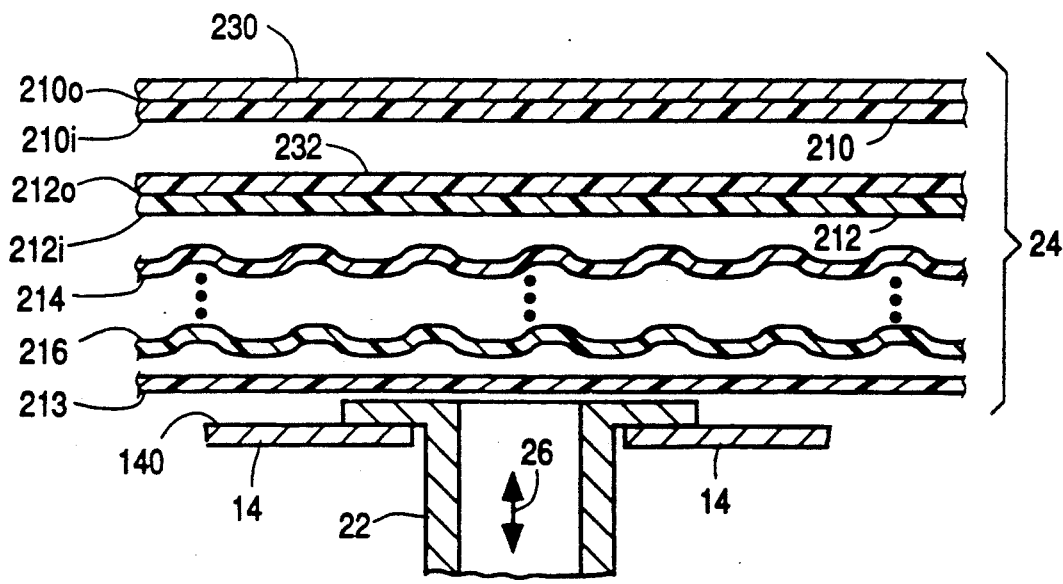

RF-TRANSPARENT SPACECRAFT THERMAL CONTROL BARRIER

The Government has rights in this invention pursuant to Contract No. F04701-89-C-0073 with the Department of the Air Force.

BACKGROUND OF THE INVENTION

Modern spacecraft may include heat generating devices such as power amplifiers, oscillators, batteries, recording sensors and the like which cumulatively produce significant heat. In addition, spacecraft may include surfaces which face the sun or other radiant heat sources for long periods of time.

The heat generated within the body of the spacecraft, the heat received from the sun or other radiant source, or the combination of the two, tends to raise the temperature of the spacecraft, particularly that portion facing the radiant heat source. As the temperature rises, the spacecraft tends to lose heat by radiation into space. At some temperature of the spacecraft, heat loss due to thermal radiation will equal the heat gain, and the temperature will stabilize. However, some portions of the spacecraft may reach a temperature higher than desired. Such a temperature might be one at which a piece of equipment fails or exceeds its specified limits.

It is desirable to reduce the heat gain from the radiant sources. This may be particularly important if the radiant source is a hostile laser. U.S. Pat. No. 4,899,810, issued Feb. 13, 1990 in the name of Fredley, describes a scheme for cooling spacecraft by the use of circulating coolant fluid and heat rejection panels, which allows portions of the structure to be cooled by transferring heat to the panels. Under many conditions, it will not be possible to use such a cooling system. Another prior art technique surrounds portions of the spacecraft with a barrier or blanket, which tends to reflect light and heat energy. A conventional thermal protective barrier or blanket might include a multilayer structure, i.e., ten layers of aluminized clear or transparent dielectric sheet such as Kapton sheet. Kapton is a trademark for polyimide film manufactured by E. I. DuPont de Nemours Company. The innermost layer of the Kapton sheet is reinforced with a glass fiber mesh adhesively bonded to its outer surface. The aluminization is electrically conductive, and acts as a reflector which tends to reflect heat and visible light away from the spacecraft body. The outer Kapton layer has a transparent conductive coating on its outer surface to reduce electrostatic discharge which might occur due to the accumulation of charge on the outer surface of the Kapton. The transparent, electrically conductive coating may be indium-tin oxide (ITO) or germanium. The eight layers of Kapton lying between the innermost and outermost sheets are embossed to reduce large areas of contact which might provide low thermal resistance paths between inner and outer layers. Such a barrier has a solar absorption ($\alpha_s$) of about 0.43, and a normal (orthogonal) emissivity ($\epsilon$) of about 0.77 relative to a black-body radiator. The transmittance through the blanket is zero at any of the infrared (IR) bands listed in Table I. The absorption ($\alpha$) and reflectance ($\rho$) for three ranges of infrared radiation (in micrometers) are listed in Table I.

TABLE I

| | $\alpha$ | $\rho$ |
|---|---|---|
| 3–5 $\mu$m | >0.20 | <0.80 |
| 5–10 $\mu$m | >0.80 | <0.20 |
| 10–25 $\mu$m | >0.70 | <0.30 |

In general, the blanket should ideally have as high a reflectance ($\rho$) as possible to reflect thermal and solar energy, and as low an absorption ($\alpha$) as possible to prevent a temperature rise of the blanket, which might be communicated to the spacecraft body. The emissivity ($\epsilon$) should be high, so that temperature rises due to absorption of energy are controlled by re-radiation into space. Other considerations must also be taken into account, such as the transmittance of energy, IR and visible light through the blanket, which should ideally be zero. Also, when considering the possibility of a hostile laser attack, the possibility of reflection of energy from the blanket onto another surface of the spacecraft is a possibility, so a highly reflective surface could be disadvantageous under that condition.

In Table I, the $\alpha$ for 3–5 $\mu$m is listed as ">0.20". The value observed varies, depending upon the exact wavelength within the band, but the least value which was observed was 0.20. Values of up to 0.8 may have been observed. Similar comments apply to other values in Table I.

The prior art blankets are effective in thermal control of a spacecraft body, or such portions of the body as may be covered. However, the above-described prior art multilayer thermal blanket is opaque to radio-frequency (RF) signals. For this purpose, RF refers to that portion of the electromagnetic spectrum lying between the UHF band (30 to 300 MHz) and the S band (2 to 4 GHz). If the spacecraft includes antennas which must be used while the spacecraft is exposed to a source of radiant energy, some method for thermal control must be used other than covering with the above-described blanket.

SUMMARY OF THE INVENTION

In accordance with the invention, an RF transparent thermal control barrier covers at least a portion of a spacecraft. The barrier includes at least an inner and an outer layer of Kapton dielectric film. A transparent conductive material coats the outer surface of the outer dielectric sheet to provide electrostatic discharge protection. A layer of white paint covers a surface of the innermost of the two layers to reflect infrared and visible light. The outer Kapton sheet tends to prevent charged particles and solar ultraviolet radiation from reaching the paint and degrading its reflective properties. In a particular embodiment of the invention, the transparent conductive layer is less than 100 Å of vapor-deposited indium-tin oxide from a particular manufacturer, the white paint is a silicone paint applied over a primer adhesive and air-cured to reduce delamination, and further layers of embossed Kapton are interposed between the two above-mentioned layers and the surface of the spacecraft.

DESCRIPTION OF THE DRAWING

FIG. 1 is a perspective or isometric view of a spacecraft body with antennas which are to be protected by means of a protective barrier or blanket against thermal effects of solar and/or laser radiation;

FIG. 2 illustrates in conceptual cross-section the outer wall of the spacecraft, an antenna, and a multilayer thermal barrier in accordance with the invention.

DESCRIPTION OF THE INVENTION

Figure 3:
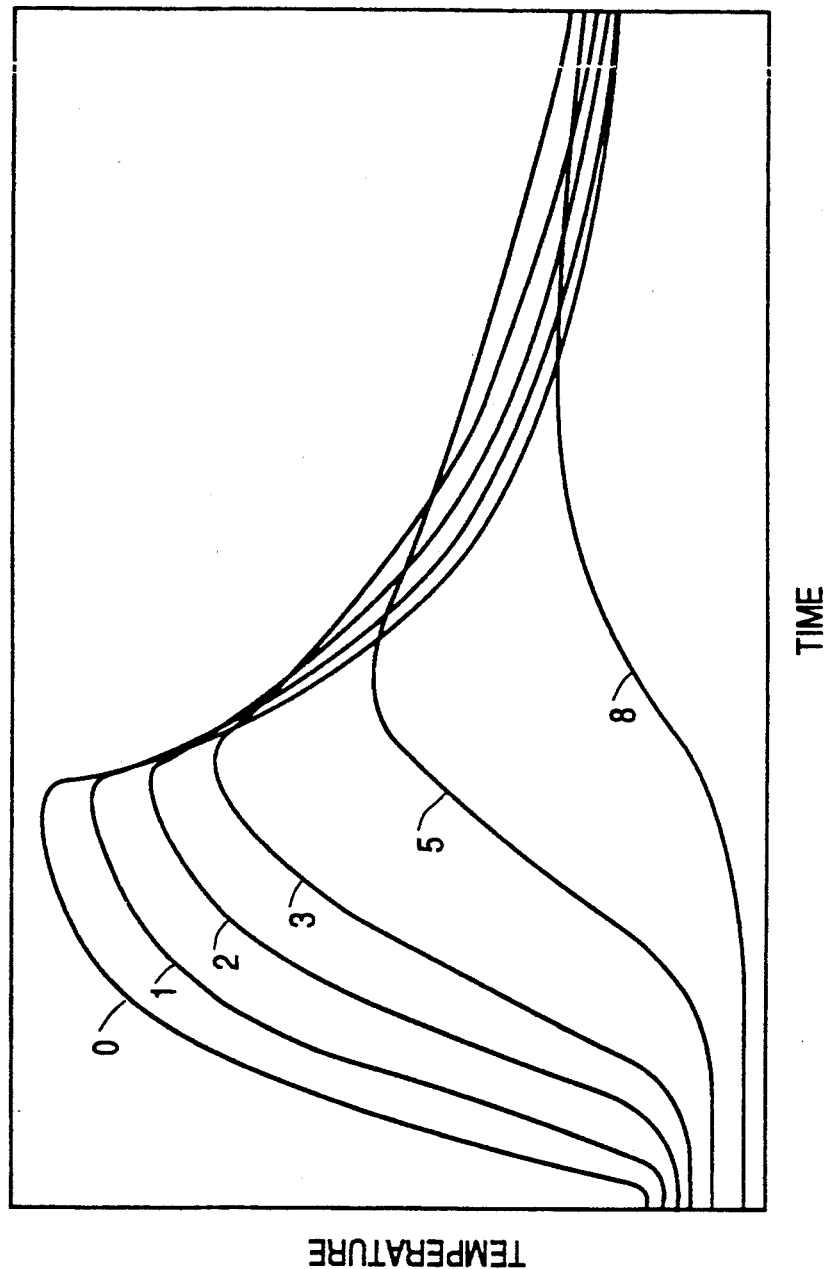
FIG. 3 illustrates the calculated temperature of the innermost Kapton layer of an N-layer system according to the invention, plotted against time.

FIG. 1 is a perspective or isometric view, partially exploded to illustrate details, of a spacecraft designated generally as 10, which includes a body 12 defining at least one portion or face of a wall 14 which faces a source, illustrated as 16, of radiation.

Spacecraft 10 further includes solar panels 18a and 18b and a dish antenna 20 supported by body 12. As mentioned, a prior art thermal barrier or blanket could be used to cover wall 14 of body 12 of spacecraft 10 to thermally protect it against radiation from source 16. However, wall 14 includes an antenna, illustrated in FIG. 1 as a flush-mounted horn antenna 22 with a radiating aperture (not separately designated) facing outward. The presence of antenna 22 on wall 14 of spacecraft body 12 means that the prior-art RF-opaque thermal blanket, if used, would prevent transmission therefrom and reception thereby.

Those skilled in the art know that antennas are reciprocal devices, and their characteristics, such as impedance, radiation pattern and the like, when transmitting are identical to those when receiving. When a transmitting or receiving term is used, the other term is understood. Thus, a "radiating" aperture is one and the same as a "receiving" aperture.

According to the invention, a thermal barrier or shield 24 covers wall 14. Shield 24 is illustrated as a solid object exploded away from wall 14, but in actuality it comprises a multilayer structure held together at the edges with Fluorglas thread manufactured by Fluorglas, McCaffrey Street, P.O. Box 320, Hoosick Falls, N.Y., and fastened to body 12 by Nomex Velcro manufactured by Velcro USA, Inc., 406 Brown Avenue, P.O. Box 5218, Manchester, N.H.

FIG. 2 is a partial cross-section of thermal blanket 24 and the associated portion of wall 14 and antenna 22, taken along section lines 2—2 of FIG. 1. Elements of FIG. 2 corresponding to those of FIG. 1 are designated by like reference numerals. In FIG. 2, antenna 22 radiates or receives electromagnetic energy, in the directions of double-headed arrow 26, at any frequency within the range extending from the UHF band to the S band.

In FIG. 2, thermal barrier or blanket 24 is seen in cross-section, and includes an outermost transparent layer 210 of Kapton dielectric film 0.002 inches thick, defining an outer (space-facing) surface 210o and an inner surface 210i. Kapton is a form of polyimide produced by E. I. DuPont de Nemours Company.

A layer 230 of conductive material is affixed to outer surface 210o of Kapton layer 210. Conductive material 230 is selected to provide sufficient conductivity to prevent electrostatic discharge, and is thin enough, and has a sufficiently high resistivity, to provide low attenuation of RF signals passing therethrough. A vapor-deposited conductive indium-tin oxide coating having a thickness of less than 100 Å and a resistance ranging from $10^6$ to $10^9$ ohms per square, produced by Sheldahl of 1150 Sheldahl Road, Box 170, Northfield, Minn., has been found to be satisfactory. A second transparent layer of 0.002 inch Kapton film 212 is interposed between inner surface 210i of outermost Kapton layer 210 and outer surface 14o of spacecraft wall 14.

A layer 232 of white silicone paint, type S13G/LO-1 manufactured by Illinois Institute of Technology Research Institute (IITRI) of 10 West 35th Street, Chicago, Ill. is applied to outer surface 212o of Kapton 212. The paint is applied to a thickness of about 4.5–7.5 mils. In order to promote adhesion, an adhesive primer, type A-1100, manufactured by Union Carbide Chemicals and Plastics Company, Inc., whose address is 318-24 4th Avenue, P.O. Box 38002, South Charleston, W. Va., is applied to surface 212o before application of the white silicone paint. Silicone paint is stable at higher temperatures than other paints, such as Chemglaze Z202 polyurethane paint, which is described in conjunction with a single-layer RF-transparent membrane in a patent application entitled Antenna Sunshield Membrane, filed concurrently herewith in the name of Bogorad et al.

It has been discovered that seven-hour oven-curing of the silicone paint layer 232 releases solvents which tend to soften the primer, which in turn tends to weaken the bonds holding the paint, primer and Kapton together, resulting in a tendency toward delamination. This has been solved by adopting a room-temperature or air cure for a period of seven days, which prevents the conditions under which the tendency toward delamination occurs.

Silicone paint of the above type has been found to undergo long-term degradation in the presence of a fluence of charged particles and also due to intense ultraviolet light. When so degraded, the paint attenuates RF signals passing therethrough, and the thermo-optical property such as $\epsilon$ and $\rho$ also change.

The thickness of outermost Kapton layer 210 in one embodiment of the invention was two mils (0.002 inch or 0.051 mm), but is not critical, so long as the thickness of the outer layer is sufficient to absorb a substantial amount of solar ultraviolet light. Thus, outermost Kapton layer 210 protects paint layer 232 from degradation due to charged particle fluence and due to ultraviolet light. Second Kapton layer 212 is also two mil thick.

Outgassing from paint layer 232 of FIG. 2 due to temperature might produce vapors which, if not contained, could deposit on the exterior surfaces of sensors or equipments of the spacecraft. Such deposits might be corrosive or otherwise impair the functioning of the sensors or equipments. The location of paint layer 232 in accordance with the invention is between two dielectric sheets, which constrains any outgassing vapors and prevents them from being deposited elsewhere.

Thermal blanket 24 of FIG. 2 further includes an innermost sheet 213 of transparent Kapton film with a thickness of 2 mil. Innermost sheet 213 is not embossed to ease handling and for good contact with the velcro fastener.

Further layers of embossed transparent Kapton film, such as layers 214 and 216 of FIG. 2, are interposed between second layer 212 and innermost layer 213. Each of these layers also has a thickness of 2 mil. Layers 213, 214, 216, and other additional layers of Kapton film insulate spacecraft wall 14 from the temperature rise in outer layers of thermal blanket 24. The embossing of sheets 214 and 216 (and other sheets, if used) reduces the area of contact between one sheet and the next, thereby increasing the thermal resistance for heat conduction from sheet to sheet.

Table II tabulates the properties of a two-Kapton-layer blanket (i.e., layers 210/230 and 212/232 of FIG.

2) according to the invention, for comparison with the properties of a conventional thermal blanket listed in Table I. The $\alpha_s$ of this blanket is 0.41 and the $\epsilon$ is 0.88, and the transmittance is 0.03 to 0.05.

TABLE II

| | $\alpha$ | $\rho$ |
|---|---|---|
| 3-5 μm | >0.80 | <0.10 |
| 5-25 μm | >0.90 | <0.10 |

Table III tabulates the properties of a five-Kapton-layer blanket according to the invention (i.e. layers 210/230, 212/232, 213, 214 and 216) for comparison with the properties listed in Tables I and II. The $\alpha_s$ of the three-Kapton-layer blanket is 0.44, the $\epsilon$ is 0.88, and the transmittance is zero.

TABLE III

| | $\alpha$ | $\rho$ |
|---|---|---|
| 3-5 μm | >0.85 | <0.15 |
| 5-25 μm | >0.90 | <0.10 |

FIG. 3 is a plot of temperature versus time for the innermost layer of a system including ITO-coated outer Kapton sheet and paint-coated second sheet, as described above, with the number of additional inner sheets as a parameter. The number designating the plot corresponds to the number of additional layers of the blanket, as for example the plot designated "0" has no additional layers, the plot designated "1" has one additional layers similar to layer 213 of FIG. 2, the plot designated "2" has two additional layers similar to layers 213 and 214 of FIG. 2 and the plot designated "8" has eight additional layers. It appears that the use of additional layers tends to reduce the temperature up to a crossover time, which crossover time is itself extended with an increasing number of layers. This suggests that protection against thermal effects due to a hostile laser can be prolonged by using additional inner layers of Kapton sheet for insulation in addition to the ITO-coated outer sheet and the paint-coated second sheet.

Comparison of the properties of the two- and five-layer blanket according to the invention, as tabulated in Tables II and III, with the properties of the conventional RF-opaque blanket listed in Table I, shows that blankets according to the invention tend to be more absorbent and less reflective in all IR bands. There is therefore a lesser likelihood of reflection to adjacent structures with blankets according to the invention. The absorption tends to be concentrated in the two outer layers of the blanket, which is where the temperature rise due to radiation tends to be concentrated. The temperature rise is not, however, communicated to the underlying structures very fast when additional layers are used, as indicated in FIG. 3.

The attenuation of RF signals was measured to be <0.05 dB in the 45 MHz to 2 GHz range for the two-layer blanket and for the 5-layer blanket.

Other embodiments of the invention will be apparent to those skilled in the art. For example, a blanket according to the invention may be used over structures which are not required to transmit or receive RF. Dielectric materials other than Kapton may be used, so long as they adequately protect the paint from ultraviolet radiation. Other silicone paints, may be used. Primer may or may not be required between the paint and the dielectric sheet, depending upon the properties. Primers other than A-1100 may allow oven curing of the paint. Fiberglass, Dacron polyester or other reinforcement of one or many dielectric sheets may be provided.

While a flush-mounted antenna is illustrated in FIG. 1, other types of antennas may be used. Linearly polarized antennas such as linear monopoles or dipoles, may be used, or elliptically polarized antennas such as crossed dipoles, helical antennas, spiral or conical spiral antennas, or quadrifiler helical (volute) antennas.

What is claimed is:

1. An RF-transparent thermal control barrier for protection of at least a portion of the outer surface of a spacecraft, comprising:
   a first layer of transparent polyimide film defining inner and outer surfaces;
   a second layer of transparent polyimide film defining inner and outer surfaces, said second layer of polyimide film being located closer to said outer surface of said spacecraft than said first layer of polyimide film;
   a transparent, electrically conductive coating affixed to said outer surface of said first layer of polyimide film; and
   a layer of white paint affixed to said outer surface of said second layer of polyimide film.

2. A barrier according to claim 1, wherein said transparent, electrically conductive coating comprises indium-tin oxide.

3. A barrier according to claim 2, wherein the thickness of said coating is less than 100 Å.

4. A barrier according to claim 1, wherein said layer of white paint comprises a layer of silicone paint.

5. A barrier according to claim 4, further comprising an adhesive-primer interposed between said layer of silicone paint and said outer surface of said second layer of polyimide film.

6. A barrier according to claim 1, wherein said first layer of polyimide film has a thickness of about 0.002 inch.

7. A barrier according to claim 1 further comprising at least one further layer of transparent polyimide film, said further layer being located between said second layer of polyimide film and said outer surface of said spacecraft.

8. A barrier according to claim 7 wherein said further layer of polyimide film has a thickness of about 0.002 inch.

9. A barrier according to claim 7 wherein said further layer of polyimide film defines a pattern of raised regions over its surface.

10. A barrier according to claim 7 further comprising a fourth layer of transparent polyimide film adjacent said further layer, said fourth layer also defining a pattern of raised regions over its surface.

11. An RF-transparent thermal control blanket for protection f portions of the outer surface of a spacecraft, comprising:
   an outer layer of transparent polyimide film having a thickness of about 0.002 inch, and defining inner and outer surfaces;
   a second layer of transparent polyimide film having a thickness of about 0.002 inch, and defining inner and outer surfaces, said second layer of polyimide film being located closer to said outer surface of said spacecraft than said inner surface of said outer layer of polyimide film;
   a transparent, electrically conductive coating having a thickness of less than 100 Å affixed to said outer surface of said outer layer of polyimide film;

a layer of adhesive affixed to said outer surface of said second layer of polyimide film;

a layer of white silicone paint affixed to said layer of adhesive; and at least one further layer of polyimide film sheet interposed between said inner surface of said second layer of polyimide film and said outer surface of said spacecraft.

12. A blanket according to claim 11 wherein said further layer of polyimide film sheet is embossed.

* * * * *